United States Patent
Yadav et al.

(10) Patent No.: US 11,627,202 B1
(45) Date of Patent: Apr. 11, 2023

(54) SCALABLE THROTTLING OF REQUESTS TO WEB SERVICES

(71) Applicant: Intuit Inc., Mountain View, CA (US)

(72) Inventors: Gourav Yadav, Bangalore (IN); Sushanth Kamath A, Mangalore (IN); Dhivya Arumugam, Bangalore (IN); Mohamed Samy Ismail, San Diego, CA (US); Anil Kumar Attuluri, San Diego, CA (US); Madhavan Narayanan, Bangalore (IN); Gokul Sarangapani, Bangalore (IN); Jason Michael Webb, San Diego, CA (US); Karim Lakhani, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/851,210

(22) Filed: Jun. 28, 2022

(51) Int. Cl.
 *H04L 67/60* (2022.01)
 *H04L 67/1021* (2022.01)
 *G06F 8/656* (2018.01)

(52) U.S. Cl.
 CPC .............. *H04L 67/60* (2022.05); *G06F 8/656* (2018.02); *H04L 67/1021* (2013.01); *G06F 2209/504* (2013.01)

(58) Field of Classification Search
 None
 See application file for complete search history.

(56) References Cited

U.S. PATENT DOCUMENTS

| | | | | |
|---|---|---|---|---|
| 5,930,234 A | * | 7/1999 | Yoshida | H04L 12/5602 370/232 |
| 6,553,420 B1 | * | 4/2003 | Karger | H04L 67/1023 709/216 |
| 8,683,481 B2 | * | 3/2014 | Bachar | G06F 9/5083 718/103 |
| 8,776,061 B2 | * | 7/2014 | Levin | G06F 9/5016 709/224 |
| 8,959,237 B2 | * | 2/2015 | Lin | H04L 67/1001 709/225 |

(Continued)

OTHER PUBLICATIONS

Amazon API Gateway, "Throttle API Requests for Better Throughput," Developer Guide, retrieved from the internet on Oct. 4, 2022 at url <https://docs.aws.amazon.com/apigateway/latest/developerguide/api-gateway-request-throttling.html>, 3-pages.

(Continued)

*Primary Examiner* — Backhean Tiv
(74) *Attorney, Agent, or Firm* — Paradice & Li LLP (57) ABSTRACT

Systems and methods for throttling requests to web services are disclosed. A system is configured to receive, at a host, one or more requests during a first time period. Each request is for a web service hosted on a backend. The host is one of a plurality of hosts of an application programming interface (API) gateway to receive a plurality of requests for the web services. The system is further configured to: process at least a portion of the one or more requests for the one or more web services; count, by a local counter in a local cache of the host, the one or more requests received at the host during the first time period; compare a local count of the local counter to a local bucket size associated with the host; and provide an instruction to update a remote count of a remote counter based on the comparison.

20 Claims, 5 Drawing Sheets

(56) References Cited

U.S. PATENT DOCUMENTS

| | | | | |
|---|---|---|---|---|
| 9,830,081 B2* | 11/2017 | Krishnasamy | ......... | G06F 3/0655 |
| 9,838,222 B2* | 12/2017 | Jorgensen | ........... | H04L 12/6418 |
| 10,033,616 B1* | 7/2018 | Zhu | ..................... | H04L 63/1408 |
| 10,237,245 B2* | 3/2019 | Bacher | ..................... | G06F 21/57 |
| 10,671,113 B2* | 6/2020 | Lovett | ................ | G06F 11/3495 |
| 11,115,284 B1* | 9/2021 | Paiva | .................. | H04L 67/5682 |
| 11,429,413 B2* | 8/2022 | Cornett | ................... | G06F 9/321 |
| 2002/0023159 A1* | 2/2002 | Vange | ..................... | H04W 8/04 |
| | | | | 709/228 |
| 2012/0167113 A1* | 6/2012 | Levin | .................... | G06F 9/5016 |
| | | | | 718/104 |
| 2019/0104198 A1* | 4/2019 | Muth | ...................... | H04L 67/51 |

OTHER PUBLICATIONS

Desgats, "How We Built Rate Limiting Capable of Scaling to Millions of Domains," Cloudflare, published Jun. 7, 2017, retrieved from the internet on Oct. 4, 2022 at url <https://blog.cloudflare.com/counting-things-a-lot-of-different-things/>, 12-pages, (Year: 2017).

Tarjan, "Scaling Your API with Rate Limiters," Stripe.com, published Mar. 30, 2017, retrieved from the internet on Oct. 4, 2022 at url <https://stripe.com/blog/rate-limiters>, 11-pages, (Year: 2017).

\* cited by examiner

Receive, at a host, one or more requests during a first time period. 402

Each request is for a web service of one or more web services hosted on a backend. 404

The host is one of a plurality of hosts of an API gateway to receive a plurality of requests for one or more web services. 406

Count, by a local counter in a local cache of the host, the one or more requests received at the host during the first time period. 408

Compare a local count of the local counter to a local bucket size associated with the host. 410

Provide an instruction to update a remote count of a remote counter based on the comparison. 412

The remote counter is in a distributed cache of the API gateway. 414

The remote counter is to count a number of requests across all of the plurality of hosts. 416

The instruction is provided for only a portion of the counts of the requests at the host. 418

SCALABLE THROTTLING OF REQUESTS TO WEB SERVICES

TECHNICAL FIELD

This disclosure relates generally to the throttling of requests to web services, including scaling the throttling of requests to the web services.

DESCRIPTION OF RELATED ART

Various services are provided via the world wide web (also referred to as the "web") or otherwise in a remote manner. For example, a news company may provide a website offering a news service to website visitors, an online shopping company may provide an online shopping service to visitors, and so on. Such services being provided may be referred to as web services, and a company may host and provide one or more web services to various entities. Such web services are hosted by a system including one or more servers, and the system is accessed via a gateway. The system is limited in the number of web service transactions that may be processed during a time period (such as based on hardware constraints of the system). As such, the gateway may limit the number of transactions to be processed by the system at one time. In limiting the number of transactions, the gateway receives a plurality of requests from various entities (such as from individual computers or other devices via the internet), and which may be in various formats (such as a format for web browser access, a format for mobile device access, and so on) to perform one or more transactions associated with one or more web services. The gateway may limit the number of requests to a subset of requests that are forwarded for execution (with any other requests over the limit not being executed at the moment). Limiting the number of requests is referred to herein as throttling.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for request throttling at a host. The method includes receiving, at the host, one or more requests during a first time period. Each request is for a web service of one or more web services hosted on a backend. The host is one of a plurality of hosts of an application programming interface (API) gateway to receive a plurality of requests for the one or more web services. The method also includes processing at least a portion of the one or more requests for the one or more web services. The method further includes counting, by a local counter in a local cache of the host, the one or more requests received at the host during the first time period. The method also includes comparing a local count of the local counter to a local bucket size associated with the host. The method further includes providing an instruction to update a remote count of a remote counter based on the comparison. The remote counter is in a distributed cache outside of the API gateway, the remote counter is to count a number of requests across all of the plurality of hosts, and the instruction is provided for only a portion of the counts of the requests at the host.

Another innovative aspect of the subject matter described in this disclosure can be implemented in a system for scaling throttling of requests to one or more web services. An example system includes one or more processors and a memory storing instructions that, when executed by the one or more processors, cause the system to perform operations. The operations include receiving, at the host, one or more requests during a first time period. Each request is for a web service of one or more web services hosted on a backend. The host is one of a plurality of hosts of an API gateway to receive a plurality of requests for the one or more web services. The operations also include processing at least a portion of the one or more requests for the one or more web services. The operations further include counting, by a local counter in a local cache of the host, the one or more requests received at the host during the first time period. The operations also include comparing a local count of the local counter to a local bucket size associated with the host. The operations further include providing an instruction to update a remote count of a remote counter based on the comparison. The remote counter is in a distributed cache outside of the API gateway, the remote counter is to count a number of requests across all of the plurality of hosts, and the instruction is provided for only a portion of the counts of the requests at the host.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Implementations of the subject matter described in this disclosure may be used for throttling requests to web services, including scaling the throttling of requests to the web services. In particular, systems and methods of using local counters in local caches in one or more hosts to reduce the number of communications to update a remote counter in a distributed cache to track the number of current requests being processed is described. Through the use of local counters, the number of communications to the remote counter from an application programming interface (API) gateway may be reduced in order to be able to scale such systems to any desired size without reaching a throughput maximum to the distributed cache.

An API gateway that manages requests for one or more web services counts the number of requests being forwarded to a backend of the system for execution by the one or more web services. The API gateway is a single point of entry for the web services, but the API gateway may include a plurality of components to manage requests from a plurality of different devices that may be in a plurality of different formats. For example, a media streaming service may include the ability to be accessed via a web portal through a web browser or application, via a mobile application, or via a third party application associated with an open API to the media streaming service. As such, the API gateway may include a web portal API gateway component to handle requests from web portals, a mobile application API gateway to handle requests from mobile applications, and a public API gateway component to handle requests from third party applications using the open API. Each component may be included in the same server or may be included in one or more different servers from each other.

A typical API gateway uses a single counter to count the overall requests being received and forwarded to the backend. In this manner, each of the API gateway components instructs a single counter to increment the request count each time a request is received. Once the counter reaches a defined maximum, the API gateway throttles the number of requests forwarded to the backend for execution to prevent the system from being overburdened. Since a single counter is used for each of the API gateway components, the single counter is embodied remotely from each of the API gateway components. Each API gateway component transmits instructions to a distributed cache including the remote counter each time the remote counter is to be incremented in order to track the overall number of requests being received.

A problem with the use of a remote counter is that there is a practical constraint on the number of instructions to increment the remote counter. For example, through physical restrictions based on the processing power, memory, buses, etc. included in the system, the remote counter may increment up to a maximum number of times during a period of time. If the overall service grows and needs to manage more requests than capable of being handled by the API gateway, the API gateway may need to be completely redesigned and replaced in order to handle the growing needs for the overall service. Requiring a replacement of the API gateway causes the overall service to be unavailable during such maintenance (causing user dissatisfaction) and requires human resources to redesign and implement the API gateway (costing human and capital resources). As such, there is a need for an API gateway that is scalable while still accurately tracking the number of requests received in order to perform throttling when necessary. A scalable API gateway allows the API gateway to be grown to manage any number of desired requests without requiring replacement of the API gateway (thus preventing service downtime and reducing capital and human resources required in maintaining the service).

Various implementations of the subject matter disclosed herein provide one or more technical solutions to the technical problem of needing an API gateway that is scalable to manage any desired number of requests for one or more web services to ensure throttling may be performed when needed. In some implementations, a system is configured to receive, at a host, one or more requests during a first time period. Each request is for a web service hosted on a backend. The host is one of a plurality of hosts of an application programming interface (API) gateway to receive a plurality of requests for the web services. The system is further configured to: process at least a portion of the one or more requests for the one or more web services; count, by a local counter in a local cache of the host, the one or more requests received at the host during the first time period; compare a local count of the local counter to a local bucket size associated with the host; and provide an instruction to update a remote count of a remote counter based on the comparison. Through the use of local counters and periodically instructing the remote counter to increase by a number greater than one, the number of interactions with the remote counter may be reduced to less than a maximum number of instructions that may be executed by the remote counter in a period of time. The number of times to interact with the remote counter and/or the amount to increment the remote counter may be defined (and adjusted) to stay below such a maximum number as the API gateway scales to manage any number of requests.

Various aspects of the present disclosure provide a unique computing solution to a unique computing problem that did not exist prior to web-based services and the use of API gateways to manage requests for such web-based services. The number of requests may be in the thousands or hundreds of thousands received every second (or in another short amount of time). Through the processing of electronic operations to perform one or more web services (which may be large numbers of operations performed in a short amount of time), implementations of the subject matter disclosed herein are not an abstract idea such as organizing human activity or a mental process that can be performed in the human mind.

As noted herein, a company or entity may employ a system to host a service. As used herein, a web service may refer to a microservice or portion of an overall service being provided. For example, for an on-demand media streaming service that is accessed via a web portal, smartphone application, or other means through the internet, the media streaming service may be hosted by one or more servers employed by the company offering the service. The media streaming service includes a plurality of microservices, such as a catalog service to manage the catalog of media available for streaming, a recommendation service to manage streaming recommendations to an individual, a review service to manage customer reviews of various media in the catalog, a playback service to manage retrieval and play of a selected media, and so on. In another example, an online shopping service may include a catalog microservice cataloging the items being sold, a shopping cart microservice managing the shopping cart of the different individuals interacting with the online shopping service, an ordering microservice managing payment and ordering operations of individuals completing orders, and so on.

As noted herein, a company providing a service may use an API gateway to manage the requests for one or more web services. As used herein, a request may refer to one or more calls to one or more web services on behalf of an individual accessing the service. A request may include one call or a plurality of calls to any number of microservices. For example, for an online shopping service, a request to order a specific item may include a call to the catalog microservice to look for the item in the store's inventory, a call to the shopping cart microservice to add the item to the individual's shopping cart, and a call to the ordering microservice to order and pay for the item in the shopping cart. In another example, the request may include calls associated with a plurality of different items, with each item requiring one or more different calls.

To note, the examples herein refer to microservices as web services exclusively for clarity in explaining aspects of the present disclosure. However, a web service may also refer to a plurality of microservices or another portion of the overall service. In addition, the examples herein refer to a request for the web services as one or more calls to one or more microservices exclusively for clarity in explaining aspects of the present disclosure. However, a request may refer to an requested interaction with one or more web services hosted by a backend of a system. The system hosting the overall service may include one or more servers, which may be employed in a centralized manner (such as within a central server room or server bank) or a distributed manner (such as via cloud computing or similar distributed computing systems). A system to host the overall service, including an API gateway to manage requests to the overall service, is described in more detail with reference to FIG. 1.

Figure 1:
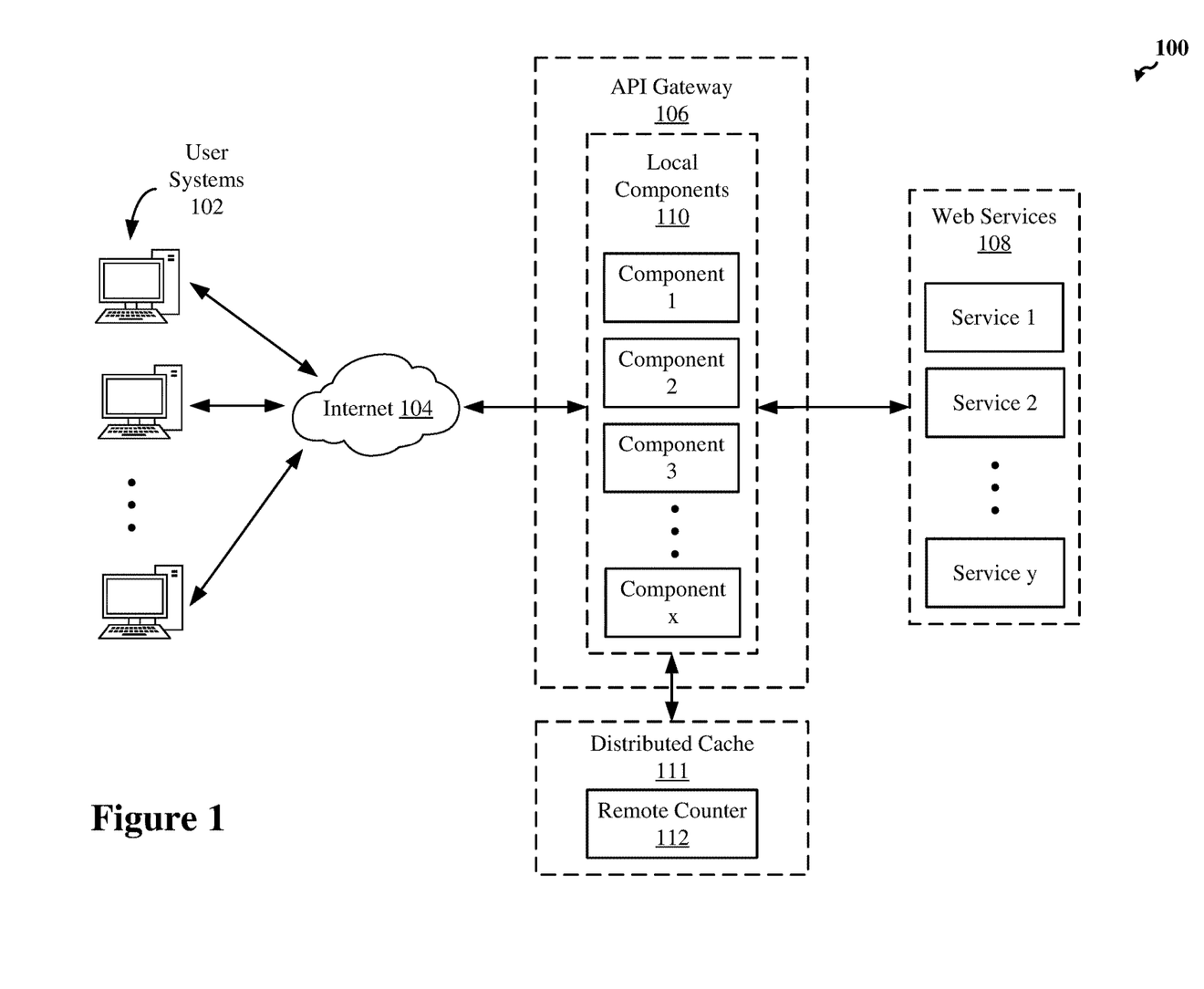
FIG. 1 shows an example network including an application programming interface (API) gateway to manage requests for one or more web services.

FIG. 1 shows an example network 100 including an API gateway 106 to manage requests for one or more web services 108. The API gateway 106 and the web services 108 may be included in a system, which may include one or more servers storing and executing instructions to perform the logical components of the web services 108 and the API gateway 106. In some implementations, the API gateway 106 and the web services 108 are included in a same computing system. In some other implementations, the API gateway 106 may be included in a separate computing system from the web services 108. For example, one or more servers may be used to host the API gateway 106, and another one or more servers may be used to host the web services 108. The web services 108 include services 1–y (for any suitable integer y). Each service 1–y may include a microservice of the overall service being hosted.

The API gateway 106 may be configured to perform any number of functions in managing the requests from one or more user systems 102 (which may access the service via the internet 104) for one or more web services 108. In particular, the API gateway 106 is configured to oversee the number of requests being received and processed and perform throttling as required to ensure the system is not overburdened by the number of requests received. The API gateway 106 may also be configured to perform request routing, security from external attacks, caching, and so on. While not shown in FIG. 1, a system may also include one or more load balancers to balance loads between system components (such as between a plurality of servers). The user systems 102 are depicted as personal computers only for illustration purposes. However, the user systems 102 may include any form of personal electronic device capable of accessing the service, such as personal computers, smartphones, tablets, personal digital assistants (PDAs), e-readers, and so on.

The API gateway 106 may be hosted by one or more servers. As depicted in FIG. 1, the API gateway 106 includes local components 110 (which include components 1–x for any suitable integer x). The local components 110 may be a logical division of the API gateway 106 (such as a division of software components) and/or may be a physical division of the API gateway 106 (such as a division of hardware components). For example, as noted herein, an API gateway may include different gateway components associated with different types of requests received (such as different format requests based on whether the requests originated from a third party application, from a web browser, or from a mobile device application). Each gateway component may be one of the local components 110. Each local component 110 may be hosted by its own set of one or more servers so that the API gateway 106 may be conceptualized as being divided at the server level. In another example, the local components 110 may be hosted on the same server so that the API gateway 106 may be conceptualized as being divided at the software level (such as each gateway component being embodied in separate software being executed by the server).

In some implementations, the API gateway 106 is employed in a cloud computing environment. For example, the API gateway 106 may be employed in the Amazon® Web Services (AWS) infrastructure (referred to herein as the AWS). With the API gateway 106 in the AWS, the API gateway 106 may include one or more Amazon Elastic Computing Cloud (EC2) instances, which are virtual machines (VMs) that may function as virtual servers for hosting the API gateway. In some implementations, each component of the local components 110 may be associated with an EC2 instance. In this manner, an EC2 instance may host a specific API gateway component (such as a first EC2 instance being configured to handle mobile requests, a second EC2 instance being configured to handle web browser requests, and so on). However, an EC2 instance may be configured to handle any number or type of requests (based on the specific resources of the VM). As a result, as the number of requests to be handled by the API gateway 106 increases, the number of EC2 instances (or number of local components 110 when not in the AWS) may be increased. In the following examples, the term "host" is used to refer to a local component. In some implementations, a host may refer to an EC2 instance if the API gateway is employed in the AWS. In some other implementations, a host may refer to any suitable VM or actual machine to manage a portion of the requests received from the user systems.

Each host receives one or more requests from the user systems 102. Regardless of whether the host is a VM or a physical machine, each host includes a local cache. For request throttling, the host includes a counter in the local cache (referred to as a local counter) to count the number of requests received and processed by the host. While requests are still to be executed, the requests may be routed by the host to the appropriate web services 108. When a maximum number of overall requests during a time period is reached, the host may prevent the routing of requests to the specific web services 108.

In order to count the number of overall requests, the API gateway 106 interacts with a distributed cache 111 including a remote counter 112 that is remote to the one or more hosts. In some implementations, Memcached on the AWS may be used to implement a remote counter for counting the number of overall requests received and/or processed at the one or more hosts. Based on a local counter in a local cache of a host, the remote counter 112 may be instructed by the host to be updated periodically (such as instructing the remote counter be increased by five every fifth request received by the host). In this manner, the remote counter 112 may count the number of overall requests received without requiring each host to instruct the remote counter 112 be incremented each time a request is received.

The hosts may be configured to adjust the frequency at which the remote counter 112 is updated (i.e., in adjusting the local bucket size). In some implementations, as the count at the remote counter 112 approaches a threshold number of requests associated with throttling, the hosts may increase the frequency at which the remote counter 112 is updated by decreasing the local bucket size to ensure that the threshold number of requests is not overshot before performing throttling. For example, the interval of updating the remote counter 112 may be reduced from five requests to three requests as a count from the remote counter 112 reaches a first number, and the interval may again be reduced from three requests to every request as the count reaches a second number closer to the threshold for throttling. Aspects of the API gateway 106 and a distributed cache 111 including a remote counter 112 are described in more detail below with reference to one or more examples.

Figure 2:
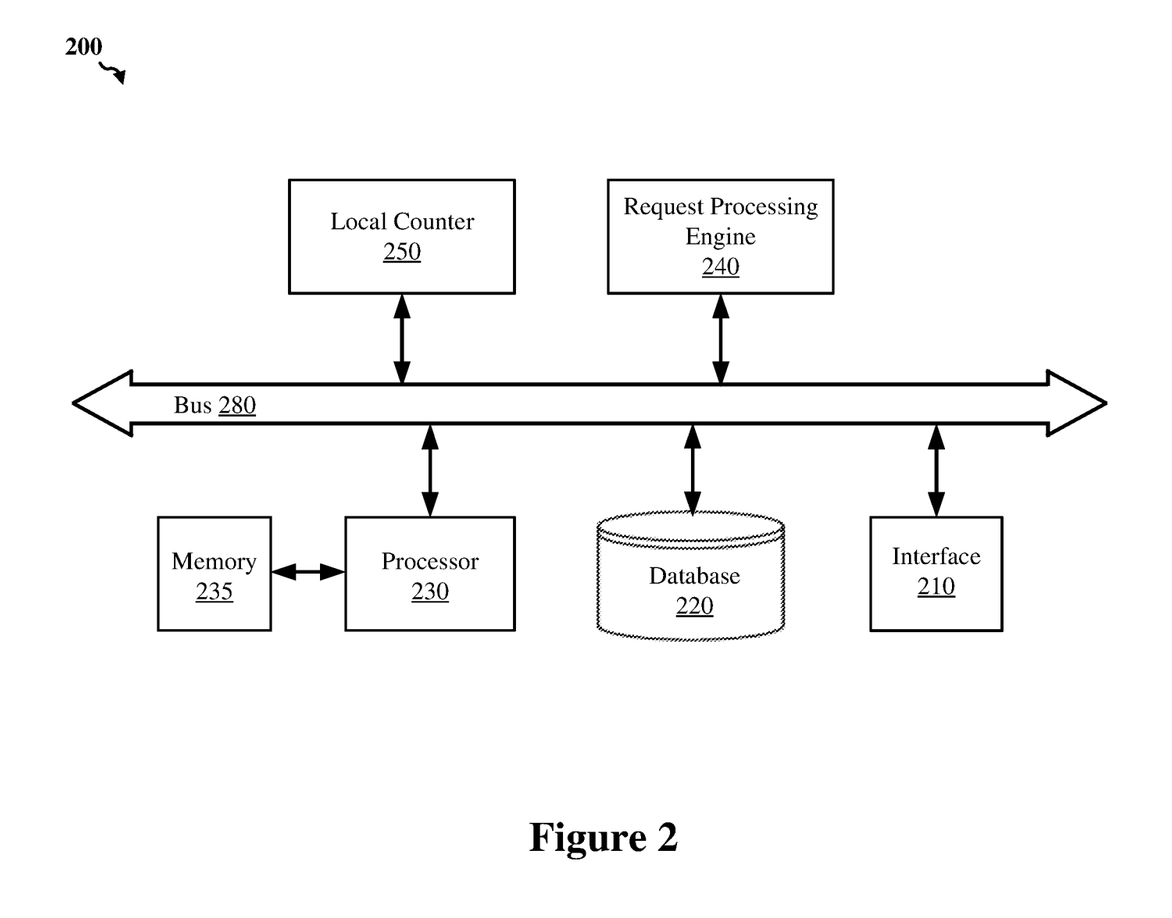
FIG. 2 shows an example system to throttle requests for one or more web services.

FIG. 2 shows an example system 200 to throttle requests for one or more web services. The system 200 may be configured to include all of an API gateway (such as the API gateway 106) or a portion of an API gateway (such as one or more hosts). If the system 200 is to include only a portion of the hosts, a plurality of systems (including the system 200) may be communicably coupled to one another to employ the API gateway (such as in a cloud computing environment, such as the AWS). In some implementations, a distributed cache including a remote counter may be outside of the system 200. The system 200 includes an interface 210, a database 220, a processor 230, a memory 235 coupled to the processor 230, a request processing engine 240, and a local counter 250. In some implementations, the various components of the system 200 may be interconnected by at least a data bus 280, as depicted in the example of FIG. 2. In other implementations, the various components of the system 200 may be interconnected using other suitable signal routing resources.

To note, the system 200 may include one computing device or a plurality of computing devices (such as a plurality of servers), and the components of the system 200 may be embodied in any manner across the one or more computing devices. While not depicted in FIG. 2, the system may also include the one or more web services or other portions of the service being provided. The system 200 is described below as a system or device including a single host exclusively for clarity in explaining aspects of the present disclosure.

The interface 210 may be one or more input/output (I/O) interfaces to receive one or more requests for web services (such as a request including one or more calls to one or more microservices hosted by a backend). The interface 210 may also transmit an instruction to update a remote counter outside of the API gateway, receive an updated remote count from the remote counter, transmit requests or calls to the respective web services for execution, receive responses from the web services, and transmit responses to one or more user devices in response to requests received from the one or more user devices.

An example interface may include a wired interface or wireless interface to the internet or other means to communicably couple with other devices. For example, the interface 210 may include an interface with an ethernet cable or a wireless interface to a modem, which is used to communicate with an internet service provider (ISP) directing traffic to and from other devices. In another example, a wired or wireless interface may connect the system 200 to another device over a device to device link or in an intranet. The interface 210 may also include an internal interface with a backend hosting the one or more web services. If the system 200 is employed in in the AWS, the interface 210 may include a virtual interface of a VM to one or more web service objects employed in the AWS. The interface 210 may also include a virtual or physical interface to a distributed cache including the remote counter outside of the API gateway.

The database 220 may store requests from one or more user systems received at the interface 210, portions of the processed requests, or responses from the one or more web service objects associated with one or more received requests. The database 220 may also store information regarding request throttling (such as whether enabled at the moment, requests not forwarded, and so on). In some implementations, the database 220 may include a relational database capable of presenting information as data sets in tabular form and capable of manipulating the data sets using relational operators. The database 220 may use Structured Query Language (SQL) for querying and maintaining the database 220.

The processor 230 may include one or more suitable processors capable of executing scripts or instructions of one or more software programs stored in system 200 (such as within the memory 235). For example, the processor 230 may be capable of executing one or more applications, the request processing engine 240, and the local counter 250. The processor 230 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 230 may include a combination of computing devices (such as a combination of a DSP and a microprocessor, a plurality of microprocessors, one or more microprocessors in conjunction with a DSP core, or any other such configuration).

The memory 235, which may be any suitable persistent memory (such as non-volatile memory or non-transitory memory) may store any number of software programs, executable instructions, machine code, algorithms, and the like that can be executed by the processor 230 to perform one or more corresponding operations or functions. For example, the memory 235 may store the one or more applications, the request processing engine 240, and the local counter 250 that may be executed by the processor 230. The memory 235 may also store any data stored in the database 220 before or after processing by the processor 230. For example, the memory may obtain information regarding the received requests, portions of the requests processed by the processor 230 or other components of the system 200, etc. that may be stored in the memory 235. After performing operations by the processor 230, the output of the operations is provided by the processor 230 to the memory 235, and the output is then provided from the memory 235 to the database 220. Between the processor 230, the memory 235, the database 220, or other portions of the system 200, the system 200 includes a local cache for storing components associated with the API gateway. To note, in some implementations, hardwired circuitry may be used in place of, or in combination with, software instructions to implement aspects of the disclosure. As such, implementations of the subject matter disclosed herein are not limited to any specific combination of hardware circuitry and/or software.

The request processing engine 240 processes one or more requests received by the interface 210. Processing a request may include tracking a number of requests received by the interface 210, tracking an overall number of requests received by the API gateway, scanning a request for security purposes, or other operations associated with request throttling. In some implementations, processing a request may also include deciding the web services to which a request is to be routed, tracking the health of the API, or other operations that may be performed by an API gateway. As described in more detail herein, in some implementations, the requests processing engine 240 may be configured to count the number of requests received (or to be forwarded for processing) at the host for a period of time using the local counter 250, determine when to update a remote counter included in a distributed cache outside of the host, determine a frequency at which to update the remote counter, and other operations associated with request throttling.

The local counter 250 counts the number of requests received (or forwarded for processing) by the host. In some implementations, the request processing engine 240 instructs the local counter 250 be incremented each instance a request is received. Counting the number of requests may refer to counting the requests (which may include a plurality of calls to one or more microservices) as received from one or more user systems. Alternatively, counting the number of requests may refer to counting the calls to the microservices. In some implementations, the local counter 250 may be initialized, reset, or otherwise controlled when needed to track the number of requests for request throttling. As such, the local counter 250 may be embodied in software included in the local cache of the system 200. In some other implementations, the local counter 250 may be embodied in hardware or a combination of hardware and software.

As noted herein, tracking the number of requests received (or to be processed) is for a period of time. For example, the API gateway is to ensure that a maximum number of requests is not reached during a one second period of time (or another suitable period of time). While not shown in FIG. 2, the request processing engine 240 (or another suitable component of the system 200) may include a local timer or clock to track the period of time. For example, the local counter 250 may be initialized or reset each time a new second is reached as identified by the timer. In this manner, the number of requests being counted is for the current time period to ensure that a number of requests does not reach a maximum for the specific time period. The timer may be embodied in software and/or hardware associated with a system clock of the system 200 in order to track periods of time. As used herein, timer and clock may be used interchangeably.

While the request processing engine 240 and the local counter 250 are depicted as separate components of the system 200 in FIG. 2, the components 240 and 250 may be a single component, may include additional components, may include software including instructions stored in memory 235 or the database 220, may include application specific hardware (e.g., one or more ASICs), or a combination of the above. As such, the particular architecture of the system 200 shown in FIG. 2 is but one example of a variety of different architectures within which aspects of the present disclosure may be implemented. For example, in other implementations, components of the system 200 may be distributed across multiple devices, may be included in fewer components, and so on. Exclusively for clarity in explaining aspects of the present disclosure, the system 200 is used to describe performing operations associated with a host in the one or more examples herein.

The system 200 uses a local counter 250 to count the number of requests received and determine when to instruct a remote counter be updated. Determining whether to instruct the remote counter be updated may be based on an output of the local counter 250 being divided by a local bucket size (which may be an interval amount of requests received). If the result of the division is zero, the remote counter is to be updated by the local bucket size. For example, if the system 200 is to instruct a remote counter be updated every fifth request received, the system 200 may execute a modulo operation or use a logic divider to divide the output of the remote counter by five. When the output of the modulo operation or logic divider is not zero, the local counter has not yet reached an interval of five requests. When the output is zero, the local counter has reached an interval of five requests (such as 5, 10, 15, 20, etc. requests). As such, the output being zero may cause the system 200 to instruct the remote counter outside of the API gateway be increased by five.

Figure 3:
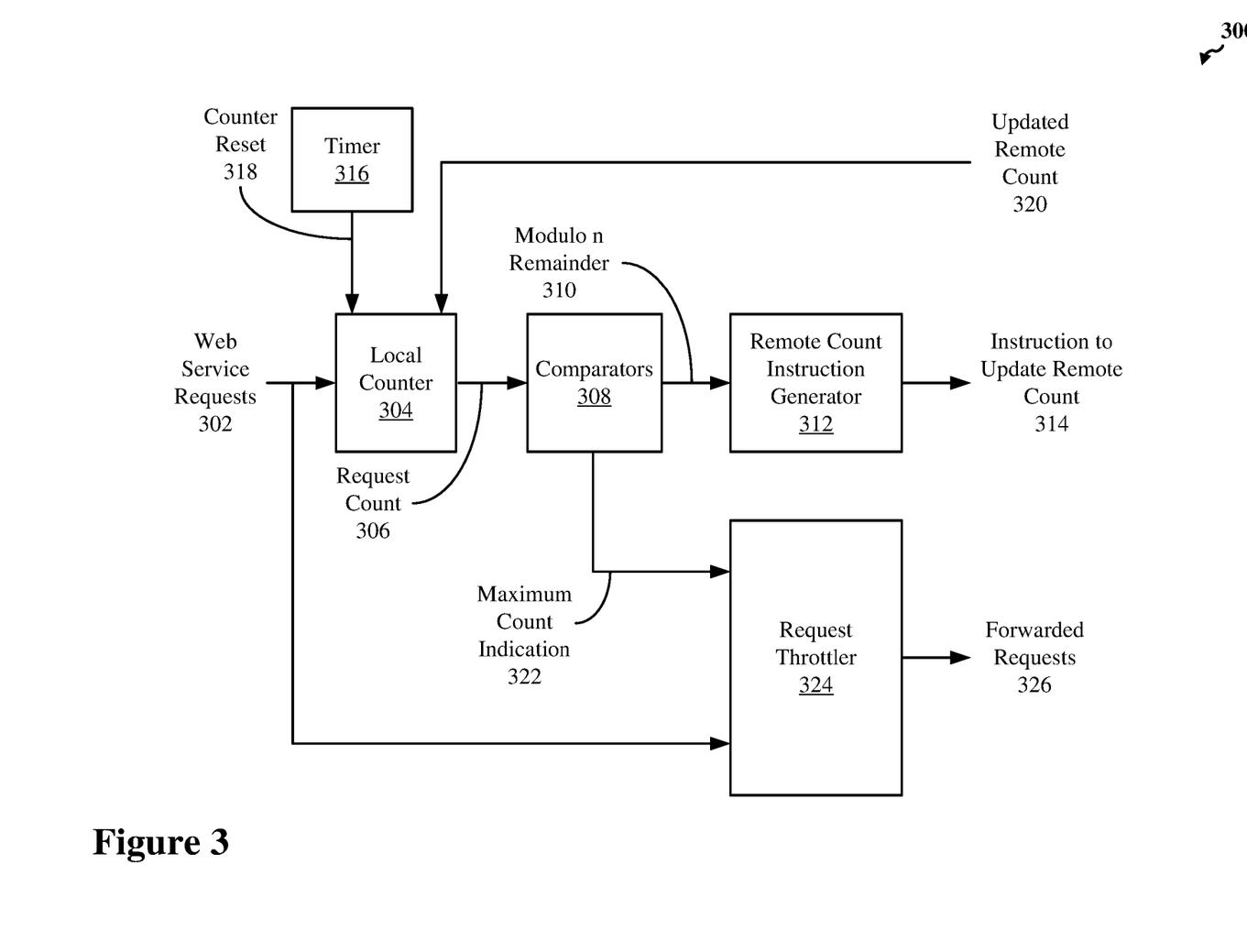
FIG. 3 shows a block diagram for updating a remote counter for request throttling.

FIG. 3 shows a block diagram 300 for updating a remote counter for request throttling. The blocks of the block diagram 300 may be embodied in one or more logical or hardware components of the system 200. As noted herein, request throttling is associated with a maximum number of requests received by the API gateway over a period of time. The maximum number of requests may also be referred to as a threshold number of requests, which may be defined in any suitable manner. For example, the threshold number of requests may be defined by a user, updated by the system or user based on past performance of the API gateway and API health, and so on.

As the web service requests 302 are received (such as by the interface 210 or by the request processing engine 240 of the system 200), the local counter 304 counts the number of requests received (which may include counting the number of overall requests or the number of calls to microservices included in the requests received). The local counter 304 may be an example implementation of the local counter 250 in the system 200. The output of the local counter 304, which is the request count 306, is processed by comparators 308 to generate a modulo n remainder 310 (for any suitable integer n). For example, the comparators 308 may include a module n operation or a logic divider configured to divide the request count 306 by integer n. Integer n may be the local bucket size indicating the interval of requests at which the remote counter is to be updated. Integer n may be determined in any suitable manner. For example, integer n may be defined as a specific integer by a user or programmer implementing the host of the API gateway. In another example, integer n may be based on the number of requests received during the time period, the number of hosts of the API gateway, and the threshold number of requests before restricting requests from being forwarded to a backend hosting one or more web services for processing. In some implementations, as the number of total requests received approaches the threshold number of requests, integer n may be decreased. For example, decreasing n may be a stepwise function, where the steps are based on a function of the number of requests received, the threshold number of requests, and the number of hosts of the API gateway.

The remote count instruction generator 312 generates an instruction to update the remote count 314 of the remote counter based on the module n remainder 310. For example, if the modulo n remainder is zero, the remote count instruction generator 312 generates the instruction 314 (which is used to increase the remote counter by n). If the modulo n remainder is not zero, the remote count instruction generator 312 does not generate the instruction 314 (as the remote counter is not yet to be updated for the host). In some implementations, the comparators 308 and the remote count instruction generator 312 may be included in the request processing engine 240 of system 200.

As noted above, the local counter is to count the number of requests during a period of time. When the period of time ends (such as after each second), the local counter may be configured to count requests received during the next period of time. The timer 316 may generate a counter reset 318 based on the period of time ending, and the counter reset 318 may be used to reset the local counter 304. As noted above, the timer 316 may be included in the request processing engine 240 (or another suitable component of the system 200). Alternatively, an indication from the remote counter or a remote timer may be received in order to reset the local counter 304. For example, the remote counter may be reset and the remote counter and the local counter may be synchronized so that the local counter is also reset.

In some implementations, the local counter 304 may also be used for the host to determine when the threshold number of requests is received by the API gateway (as counted by the remote counter). For example, in response to sending the instruction 314, the system 200 may receive an updated remote count 320 from the remote counter after the remote counter is increased by n. The local counter 304 may be updated so that the request count 306 mirrors the updated remote count 320. Since the request count 306 may continue to be divided by n, once a new number of n requests 302 are received and counted by the local counter 306, a new instruction to update the remote count 314 is generated.

For request throttling, the comparators 308 may also compare the request count 306 to the threshold number of requests to generate a maximum count indication 322. Once the request count 306 is greater than or equal to the threshold number of requests, the maximum count indication 322 indicates that the request throttler 324 is to prevent forwarding requests to a backend hosting one or more web services. In some implementations, the maximum count indication may be a bit flag or another binary indication as to whether or not the threshold number of requests is reached. The request throttler 324 may forward the web service requests 302 (forwarded requests 326) to a backend hosting the one or more web services while the overall count of requests received is less than the threshold number of requests (as indicated by the maximum count indication 322). Once the maximum counting indication 322 indicates that the threshold number of requests is reached, the request throttler 324 may prevent forwarding additional requests to the backend hosting the one or more web services. In some implementations, the request throttler 324 may be included in the request processing engine 240 (or another suitable component of the system 200).

Figure 4:
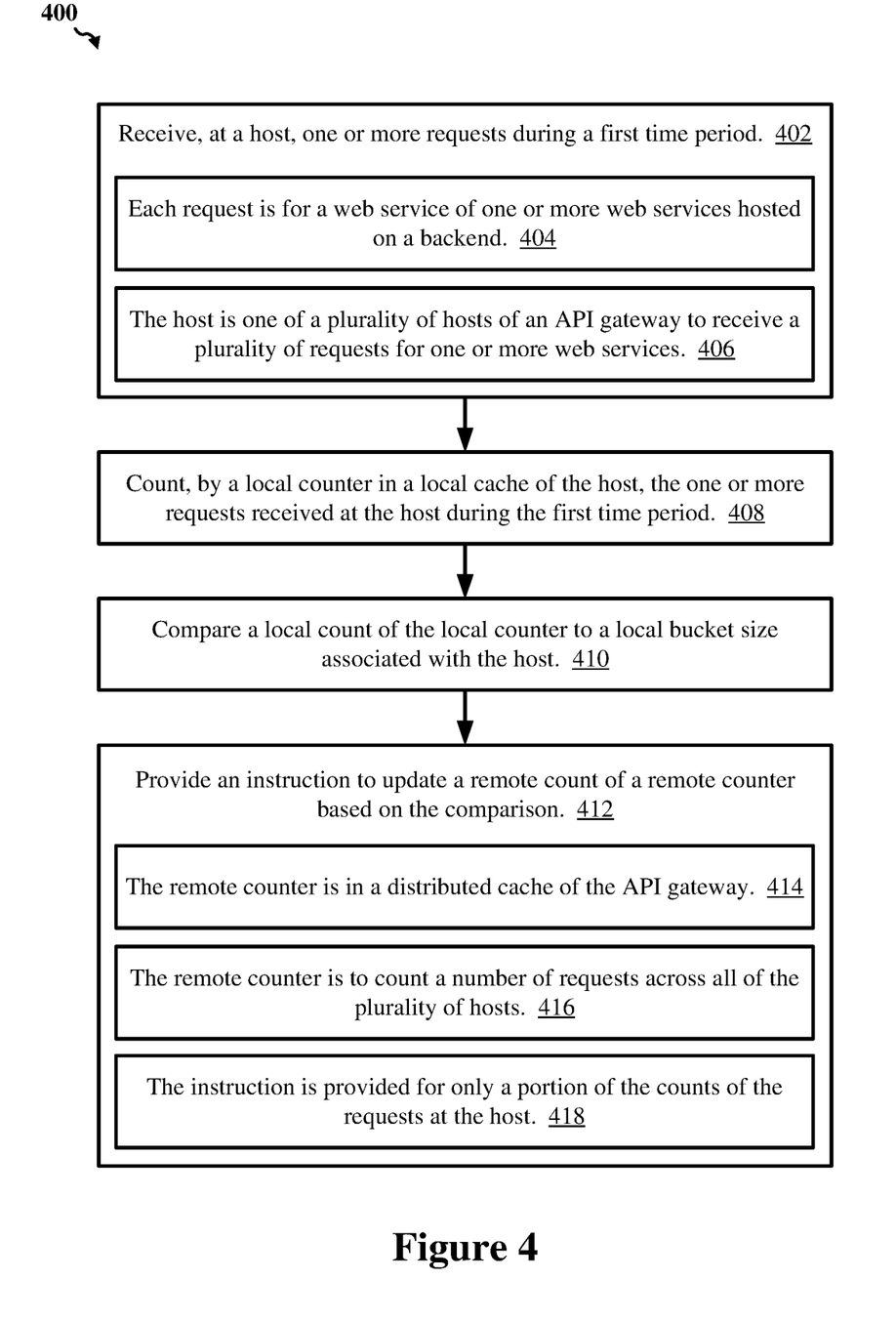
FIG. 4 shows an illustrative flow chart depicting an example operation for request throttling at a host.

FIG. 4 shows an illustrative flow chart depicting an example operation 400 for request throttling at a host. The example operation 400 is described as being performed by components of the system 200 in FIG. 2 or components of the diagram 300 in FIG. 3. At 402, the system 200 receives, at a host, one or more requests during a first time period. For example, the interface 210 receives one or more requests from one or more user systems including one or more calls to one or more microservices hosted on the backend. In this manner, each request is for a web service of one or more web services hosted on a backend (404). In addition, the host is one of a plurality of hosts of an API gateway to receive a plurality of requests for one or more web services (406).

At 408, the system 200 counts, by a local counter in a local cache of the host, the one or more requests received at the host during the first time period. For example, the local counter 250 may count the requests as received by the interface 210 or by the request processing engine 240. At 410, the system 200 compares a local count of the local counter to a local bucket size associated with the host. For example, the system 200 may divide the local count by the local bucket size to determine a remainder (such as by performing a modulo n operation on the local count to determine whether the remainder equals zero, where n is the local bucket size associated with the host). If the remainder is zero, the remote counter is to be instructed to be increased by n. If the remainder is not zero, the remote counter is not yet to be instructed to be increased.

At 412, the system 200 provides an instruction to update a remote count of a remote counter based on the comparison. The remote counter is in a distributed cache outside of the API gateway (414), and the remote counter is to count a number of requests across all of the plurality of hosts (416). For example, if the API gateway is employed in the AWS, Memcached may be used to implement the remote counter in a distributed cache with which the API gateway communicates.

The instruction to update the remote count is provided for only a portion of the counts of the requests at the host (418). In some implementations, the instruction is provided at an interval of the local count equaling an integer multiple of the local bucket size (with updating the remote count includes increasing the remote count by the local bucket size). For example, if the local bucket size is five, the system 200 prevents generating or sending an instruction to update the remote count by the local bucket size for requests 1-4 received, requests 6-19 received, requests 11-14 received, and so on. In this manner, the system 200 generates and sends instructions to update the remote count by the local bucket size for received request 5, request 10, request 15, and so on.

The local bucket size may be defined in any suitable manner. In some implementations, the system 200 calculates the local bucket size based on the number of hosts in the plurality of hosts. For example, for a local bucket size that is the same across all of the hosts, as the number of hosts increases, the rate at which the remote counter updates increases. To prevent overshooting the threshold number of requests before performing throttling and preventing the forwarding of requests to the backend hosting the one or more web services.

The local bucket size may also be based on the maximum number of requests to be processed (such as the maximum number of requests to be forwarded by the API gateway to the backend hosting the one or more web services) and the current count of requests received by the API gateway. As depicted in FIG. 3, the local counter may be updated to indicate the updated remote count of the remote counter. For example, the system 200 may receive the updated remote count of the remote counter from the distributed cache outside of the API gateway in response to providing the instruction to update the remote count. With the updated remote count received from the distributed cache, the system 200 may update the local counter based on the updated remote count (such as setting the local count to the updated remote count). In this manner, the current count of requests received by the API gateway to be used in calculating the local bucket size may be the local count from the local counter.

In some implementations, the system 200 may compare the local count to the defined maximum number of requests and define the local bucket size based on the comparison. For example, the local bucket size may be based on equation (1) below:

$$\text{local bucket size} \leq \frac{\text{max requests} - \text{local count}}{\text{number of hosts}} \quad (1)$$

Max requests is the threshold number of requests associated with the API gateway. Local count is the local count indicated by the local counter (such as after being updated based on the updated remote count). Number of hosts is the number of active hosts in the API gateway managing received requests.

In some implementations, the system 200 may attempt to default the local bucket size to five (or another suitable integer) and decrease the local bucket size (such as to three or to one) based on equation (1). For example, if the local bucket size at five causes equation (1) to not be met, the local bucket size may be decreased. As depicted in equation (1), decreasing the local bucket size from five to three to one may be based on the defined maximum number of requests minus the local count being greater than or equal to the number of hosts times the local bucket size. In some implementations, the system 200 calculates the local bucket size according to piecewise equation (2), which is based on equation (1), below:

$$\text{local bucket size} = \begin{cases} 5 & \text{if } 5 \leq \frac{\text{max requests} - \text{local count}}{\text{number of hosts}} \\ 3 & \text{else if } 3 \leq \frac{\text{max requests} - \text{local count}}{\text{number of hosts}} \\ 1 & \text{otherwise} \end{cases} \quad (2)$$

Using equation (2), the system 200 attempts to set the local bucket size associated with the host to five. If the difference of the threshold number of requests minus the local count (from the local counter) divided by the number of hosts is less than or equal to five, the local bucket size is set to five. If the difference divided by the number of hosts is greater than five, the system 200 determines if the difference divided by the number of hosts is less than or equal to three. If the difference divided by the number of hosts is less than or equal to three, the local bucket size is set to three. If the difference divided by the number of hosts is greater than three, the local bucket size is set to one. To note, the local bucket size may be set or adjusted during operation of the host. In this manner, the local bucket size may be decreased as the local count approaches the threshold number of requests while the host is receiving requests during the time period. Reducing the local bucket size allows increasing the frequency at which the remote counter is updated and the updated remote count is received to track when the threshold number of requests is reached without overshooting the threshold number of requests set for the API gateway. In setting or reducing the local bucket size, the system 200 may adjust the modulo n operator or other means to identify when a number of requests equal to an interval of the new local bucket size is received by the host.

As noted above, the threshold number of requests may be defined in any suitable manner, such as being based on the computing resources available for the API gateway and the backend hosting the one or more web services. To note, while an example implementation for calculating the local bucket size is provided in explaining aspects of the present disclosure, the local bucket size may be calculated in any suitable manner (such as based on a decay curve, a linear curve, or based on any other association to decrease the local bucket size based on the difference between the current number of requests received and the defined maximum number of requests decreasing).

In performing throttling, if the local counter is updated so that the local count is the same as the updated remote count from the remote counter, the system 200 may throttle requests at the host in response to the local count being greater than or equal to the defined maximum number of requests. Throttling may last for the defined time period (such as for the remainder of the second in which the received requests are to be counted). While throttling, the system 200 may store the requests not forwarded to the backend for processing. Alternatively, the system 200 may discard the requests not forwarded. Once the time period ends (such as proceeding to the next second), the system 200 may again forward requests for processing (until the threshold number of requests is again reached). If the system 200 stores the requests that were received but not forwarded, the system 200 may forward the stored requests. Alternatively, the system 200 may forward requests newly received during the new time period (with the unforwarded requests from the previous time period being regarded).

With beginning a new time period, the system 200 is to begin anew in counting the number of requests received. In addition, the system 200 may reset the local bucket size for the new time period. In some implementations, the system 200 resets the local counter in response to transitioning from a first time period to a second time period. The remote counter may also be reset in response to transitioning from the first time period to the second time period. With the local counter reset, the system 200 may also reset the local bucket size in response to transitioning from the first time period to the second time period (with the local bucket size being previously adjusted during the first time period). For example, as the local count from the local counter approached the threshold number of requests, the local bucket size may have been reduced from an initial size based on the difference between the threshold number of requests and the local count (such as based on equation (2) above). With the local counter reset, the difference between the threshold number of requests and the local count (which is zero) equals the maximum difference allowable, which is the threshold number of requests. As such, the system 200 may reset the local bucket size for the second time period to the initial value used for the first time period (such as five based on equation (2) above). The operations of counting the number of requests received at a host during a time period using a local counter, updating a remote counter, updating the local counter based on updating the remote counter, and performing request throttling when reaching a defined maximum number of requests to be processed may be repeated for each time period during which the API gateway is in operation. To note, resetting a counter may refer to deleting a software counter and generating a new software counter, or setting the same software counter (or a hardware counter) to zero in order to be reused for the next time period.

When the API gateway first begins operation, a remote counter in a distributed cache outside of the API gateway and a local counter in a local cache of each host of the API gateway may not be initialized. In addition, the hosts of the API gateway may not be synchronized so that the time periods begin and end at the same instance at each host. As such, the remote counter and local counters may be initialized during startup of the API gateway, and the local counters and remote counter may be synchronized. For example, the remote counter may be associated with a remote clock, and a local counter may be associated with a local clock of the host. Each local counter may be synchronized to the remote counter based on the remote clock in order for the time periods to begin and end at the same time at each host. The remote clock may be implemented in a distributed cache outside of the API gateway. In synchronizing a local counter associated with a host to the remote counter, the system 200 may receive a remote time stamp of the remote clock from the distributed cache hosting the remote counter. Based on the remote time stamp, the system 200 synchronizes the local clock of the host to the remote clock. In this manner, the first time period is synchronized at the lock clock and the remote clock.

Figure 5:
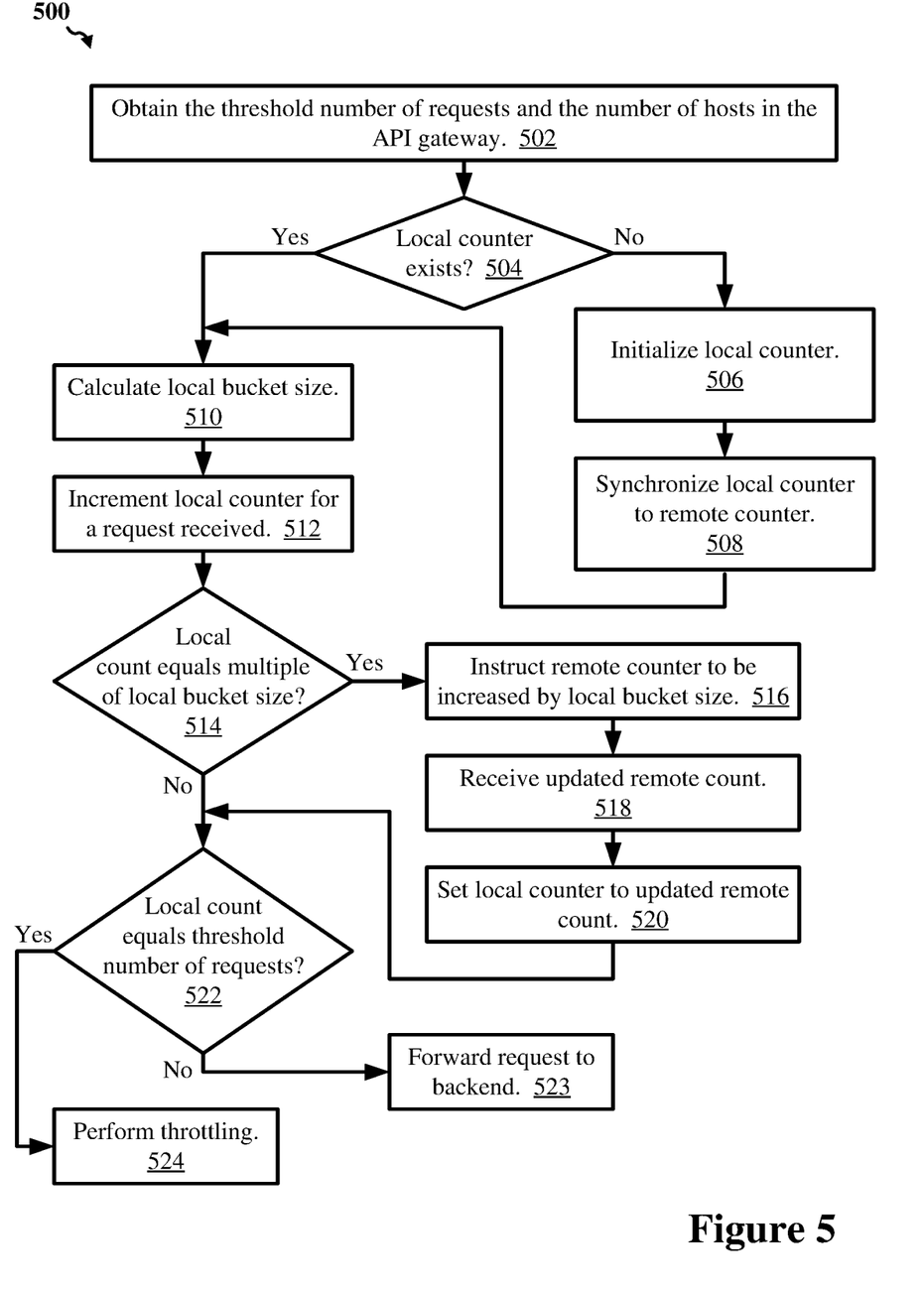
FIG. 5 shows an illustrative flow chart depicting another example operation for request throttling at a host.

FIG. 5 shows an illustrative flow chart depicting another example operation 500 for request throttling at a host. The example operation 500 is a specific implementation of the example operation 400 depicted in FIG. 4. To note, the example operation 500 is depicted for a single request during a single time period (such as the first time period depicted in FIG. 4). As such, at least portions of the example operation 500 may be repeated for a plurality of requests and a plurality of time periods. The example operation 500 is described below as being performed by the system 200, but the example operation 500 (or portions of the example operation 500) may be performed by any suitable system.

At 502, the system 200 obtains the threshold number of requests and the number of hosts in the API gateway. In some implementations regarding obtaining the threshold number of requests, the threshold number of requests may be preprogrammed into or otherwise predefined in the API gateway. In some implementations regarding obtaining the number of hosts, the API gateway may indicate the number of hosts at startup of the host or the number of hosts may be preprogrammed into the system 200. In some other implementations, the system 200 may query the hosts in order to determine the number of hosts active in the API gateway. While some examples of obtaining the number of hosts and the threshold number of requests are provided, the number of hosts and the threshold number of requests may be obtained in any suitable manner.

At decision 504, the system 200 determines whether the local counter exists. For example, the system 200 may identify whether a local counter 250 has been initialized in a local cache of the host. If the local counter does not exist, the system 200 initializes the local counter (506) in a local cache of the host. In initializing the local counter, the local count from the local counter may be set to zero to indicate that no requests have yet been counted. At 508, with the local counter initialized, the system 200 synchronizes the local counter to the remote counter. For example, the system 200 may obtain a time stamp from a remote clock or timer associated with the remote counter. The system 200 may then use the time stamp to synchronize a local clock or timer associated with the local counter so that the start time and end time of the period of time at the local clock or timer and the remote clock or timer are synchronized. After 508, the process proceeds to 510. Referring back to decision 504, if the local counter already exists, blocks 506 and 508 may be skipped, with the process proceeding to 510.

At 510, the system 200 calculates the local bucket size. For example, the system 200 may use equation (2) above (or another suitable function) to determine the local bucket size associated with the host. After calculating the local bucket size, the local bucket size may be used to update the operations for determining whether the local count is a multiple of the local bucket size. For example, referring back to FIG. 3, the system 200 may set integer n to the calculated local bucket size for a modulo n operator or another suitable means to determine whether the local count is a multiple of the local bucket size.

The host receives one or more requests during the period of time. At 512, the system 200 increments the local counter for a request received. At decision 514, the system 200 determines whether the local count equals a multiple of the local bucket size. For example, if the local bucket size equals five, the system 200 determines whether the recent request received is the fifth request, tenth request, etc. received by the host. As depicted, the system 200 determines each time that the local counter is incremented (and thus for each request) whether the local count equals a multiple of the local bucket size.

If the local count equals a multiple of the local bucket size, the system 200 instructs the remote counter to be increased by the local bucket size (516). For example, if the local bucket size is five and the number of received requests as counted by the local counter is five, ten, fifteen, etc., the system 200 instructs the remote counter in the distributed cache to be increased by five. In response to instructing the remote counter to be increased by the local bucket size, the system 200 receives the updated remote count from the remote counter (518). The API gateway may be configured such that each time the remote counter is instructed to be increased by a host, the updated remote count from the remote counter is provided back to the host in response to the instruction. The system 200 may take the updated remote count and set the local counter in the local cache of the host to the updated remote count (520). In this manner, the local counter indicates the current number of overall requests received by the API gateway. The process then proceeds to decision 522. Referring back to decision 514, if the local count does not equal a multiple of the local bucket size (such as the local count being 4, 6, 7, 8, 9, 11, etc. for the local bucket size being five), blocks 516-520 may be skipped, and the process proceeds to decision 522.

At decision 522, the system 200 determines whether the local count equals (or is greater than) the threshold number of requests for the API gateway. If the local count is equal to or greater than the threshold number of requests (indicating that a defined maximum number of requests has been received by the API gateway), the system 200 performs throttling (524). As noted herein, in performing throttling, the system 200 may prevent one or more requests from being forwarded by the host to a backend hosting the one or more web services. Throttling may be performed until the next time period when the local counter and remote counter are reset. While not shown in FIG. 5, the system 200 may reset the local counter when transitioning from a current time period to a next time period, and the process may revert to block 510. Referring back to decision 522, if the local count is less than the threshold number of requests (indicating that the API gateway has not yet received a defined maximum number of requests during the time period), throttling is not yet performed, and any received request is forwarded to the backend (523).

The example operation 500 may be performed for each request received by a host (when not performing throttling). In this manner, the process may be performed any number of times based on the number of requests received. For subsequent requests received after operation 500 has been performed at least once, the process may begin at decision 504 or at block 510 (with the threshold number and number of hosts already obtained during the first iteration of operation 500). At block 510, with previous requests having been forwarded to the backend (and potentially the remote count updated), the system 200 may calculate the local bucket size (which may be based on an updated remote count). For example, the system 200 may use equation (2) above to determine the local bucket size to be associated with the host. In this manner, as the local count increases (as more requests are received) or the local counter is reset (when transitioning to a new time period), the local bucket size may be updated (such as being decreased from five to three to one based on equation (2) above). In this manner, the local bucket size may be decreased as the remote counter's count approaches the defined maximum number of requests to be processed.

To note, while the examples are depicted regarding a single host instructing a remote counter be increased, the API gateway includes a plurality of hosts, with each host instructing the remote counter be increased. As the hosts instruct the remote counter be increased and the remote counter approaches the threshold number of requests, each of the hosts' local counters are updated to indicate the updated remote count. In this manner, each of the hosts may use its local counter's local count to update the local bucket size associated with the host. In addition, each of the hosts may use its local counter's local count to determine whether the threshold number of requests is reached (and thus whether throttling is to be performed at the host).

As described above, an API gateway is scalable to manage any desired number of requests to be forwarded for processing by a backend hosting the one or more web services. Through the use of local counters to prevent the number of instances a remote counter is updated in counting the overall number of requests received, the API gateway may be scaled to handle any number of requests to be forwarded to a backend hosting one or more web services for processing. For example, if the backend is upgraded to be capable of processing more requests during a period of time (such increasing from 600 transactions per second (tps) to 800 tps by the backend), the API gateway is scalable to manage the increased processing capability from 600 tps to 800 tps. Through the use of local counters at the hosts, the API gateway is not required to increment a remote counter up to 800 times as each request is received. In this manner, the number of times the remote counter is instructed to be increased is reduced to a manageable level to allow the API gateway to manage the increased number of requests. In addition, if the API gateway has additional hosts added to manage the increase in number of requests per time period, the entirety of the API gateway (and a distributed cache or remote counter) is not required to be redesigned, as the local bucket size may be based on the number of hosts of the API gateway. In this manner, a scalable API gateway may be employed that is able to expand and manage the growth in hosting a growing overall service without requiring downtime or other resources to maintain the API gateway or access to the distributed cache.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for request throttling at a host, comprising:
   receiving, at the host, one or more requests during a first time period, each request being for a web service of one or more web services hosted on a backend, the host being one of a plurality of hosts of an application programming interface (API) gateway to receive a plurality of requests for the one or more web services;
   processing at least a portion of the one or more requests for the one or more web services;
   counting, by a local counter in a local cache of the host, the one or more requests received at the host during the first time period;
   comparing a local count of the local counter to a local bucket size associated with the host; and
   providing an instruction to update a remote count of a remote counter based on the comparison, wherein:
      the remote counter is in a distributed cache outside of the API gateway;
      the remote counter is to count a number of requests across all of the plurality of hosts; and
      the instruction is provided for only a portion of the counts of the requests at the host.

2. The method of claim 1, wherein:
   the instruction is provided at an interval of the local count equaling an integer multiple of the local bucket size; and
   updating the remote count includes increasing the remote count by the local bucket size.

3. The method of claim 2, further comprising:
   receiving the updated remote count of the remote counter from the distributed cache in response to providing the instruction to update the remote count; and
   updating the local counter based on the updated remote count.

4. The method of claim 1, further comprising:
   receiving a remote time stamp of a remote clock from the distributed cache hosting the remote counter; and
   synchronizing a local clock of the host to the remote clock based on the remote time stamp, wherein the first time period is synchronized at the local clock and the remote clock.

5. The method of claim 1, further comprising calculating the local bucket size, wherein the local bucket size is based on the number of hosts in the plurality of hosts.

6. The method of claim 5, wherein the local bucket size is also based on:
   a maximum number of requests to be processed; and
   the local count.

7. The method of claim 6, further comprising:
   comparing the local count to the defined maximum number of requests; and
   decreasing the local bucket size based on the comparison.

8. The method of claim 7, wherein decreasing the local bucket size is based on the defined maximum number of requests minus the local count being greater than or equal to the number of hosts times the local bucket size.

9. The method of claim 7, further comprising throttling requests at the host in response to the local count being greater than or equal to the defined maximum number of requests.

10. The method of claim 1, further comprising:
    resetting the local counter in response to transitioning from the first time period to a second time period, wherein the remote counter is also reset in response to transitioning from the first time period to the second time period; and
    resetting the local bucket size in response to transitioning from the first time period to the second time period, wherein the local bucket size is adjusted during the first time period.

11. A system for request throttling at a host, the system comprising:
    one or more processors; and
    a memory storing instructions that, when executed by the one or more processors, causes the system to perform operations comprising:
       receiving, at the host, one or more requests during a first time period, each request being for a web service of one or more web services hosted on a backend, the host being one of a plurality of hosts of an application programming interface (API) gateway to receive a plurality of requests for the one or more web services;
       processing at least a portion of the one or more requests for the one or more web services;
       counting, by a local counter in a local cache of the host, the one or more requests received at the host during the first time period;
       comparing a local count of the local counter to a local bucket size associated with the host; and
       providing an instruction to update a remote count of a remote counter based on the comparison, wherein:
          the remote counter is in a distributed cache outside of the API gateway;
          the remote counter is to count a number of requests across all of the plurality of hosts; and
          the instruction is provided for only a portion of the counts of the requests at the host.

12. The system of claim 11, wherein:
    the instruction is provided at an interval of the local count equaling an integer multiple of the local bucket size; and
    updating the remote count includes increasing the remote count by the local bucket size.

13. The system of claim 12, wherein the operations further comprise:
    receiving the updated remote count of the remote counter from the distributed cache in response to providing the instruction to update the remote count; and
    updating the local counter based on the updated remote count.

14. The system of claim 11, wherein the operations further comprise:
    receiving a remote time stamp of a remote clock from the distributed cache hosting the remote counter; and
    synchronizing a local clock of the host to the remote clock based on the remote time stamp, wherein the first time period is synchronized at the local clock and the remote clock.

15. The system of claim 11, wherein the operations further comprise calculating the local bucket size, wherein the local bucket size is based on the number of hosts in the plurality of hosts.

16. The system of claim 15, wherein the local bucket size is also based on:
    a maximum number of requests to be processed; and
    the local count.

17. The system of claim 16, wherein the operations further comprise:
   comparing the local count to the defined maximum number of requests; and
   decreasing the local bucket size based on the comparison.

18. The system of claim 17, wherein decreasing the local bucket size is based on the defined maximum number of requests minus the local count being greater than or equal to the number of hosts times the local bucket size.

19. The system of claim 17, wherein the operations further comprise throttling requests at the host in response to the local count being greater than or equal to the defined maximum number of requests.

20. The system of claim 11, wherein the operations further comprise:
   resetting the local counter in response to transitioning from the first time period to a second time period, wherein the remote counter is also reset in response to transitioning from the first time period to the second time period; and
   resetting the local bucket size in response to transitioning from the first time period to the second time period, wherein the local bucket size is adjusted during the first time period.

* * * * *